United States Patent
Baier et al.

(10) Patent No.: US 6,519,477 B1
(45) Date of Patent: Feb. 11, 2003

(54) METHOD FOR CHANNEL ESTIMATION FROM RECEIVED SIGNALS TRANSMITTED VIA A RADIO CHANNEL

(75) Inventors: Paul Walter Baier, Kaiserslautern; Josef Blanz, Kindsbach; Martin Haardt, München, all of (DE); Apostolos Papathanassiou, Athen/Nea Smyrni (GR)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/407,257

(22) Filed: Sep. 27, 1999

Related U.S. Application Data

(63) Continuation of application No. PCT/DE98/00877, filed on Mar. 25, 1998.

(30) Foreign Application Priority Data

Mar. 25, 1997 (DE) .......................................... 197 12 501

(51) Int. Cl.[7] ................................................. H04B 1/38
(52) U.S. Cl. ........................ 455/562; 375/148; 370/328
(58) Field of Search ................................ 375/130, 144, 375/148; 455/452, 451, 450, 455, 25, 561, 562; 370/328

(56) References Cited

U.S. PATENT DOCUMENTS

| | | | |
|---|---|---|---|
| 5,299,148 A | | 3/1994 | Gardner et al. ............. 342/378 |
| 5,615,409 A | * | 3/1997 | Forssen et al. ............. 455/562 |
| 5,856,804 A | * | 1/1999 | Turcotte et al. ............. 342/371 |
| 5,887,262 A | * | 3/1999 | Willhoff ..................... 455/562 |
| 6,144,340 A | * | 11/2000 | Kiiski et al. ................ 455/424 |
| 6,151,513 A | * | 11/2000 | Petry et al. ................. 455/562 |
| 6,229,481 B1 | * | 5/2001 | Katz ........................... 455/562 |

FOREIGN PATENT DOCUMENTS

| | | |
|---|---|---|
| DE | 42 01 439 A1 | 7/1993 |
| DE | 195 11 752 A1 | 10/1996 |

OTHER PUBLICATIONS

Brockhaus Encyclopedia, 19th edition, second volume, pp. 136–137.
"Optimum and Sub–Optimum Detection of Coded Data Disturbed by Time–Varying Intersymbol Interference" (Koch et. al.), IEEE May 1990, pp. 1679–84.
"An Adaptive Antenna Array with Parallel Beamformers for Indoor Radio Channel Enhancement" (Wang et al.), IEEE, vol. 1, Mar. 1997, pp. 188–192.
"The Bursts", chapter 4.3.1. of GSM System for Mobile Communications, 1992, pp. 231–237.

* cited by examiner

*Primary Examiner*—Nguyen T. Vo
*Assistant Examiner*—Eliseo Ramos-Feliciano
(74) *Attorney, Agent, or Firm*—Laurence A. Greenberg; Werner H. Stemer; Gregory L. Mayback

(57) ABSTRACT

A method for estimating a channel from received signals transmitted via the channel, includes the steps of receiving the received signals with receiving sensors of a receiving device. The received signals are composed of a plurality of subscriber signals. The subscriber signals are marked with transmitter-specific fine structures. A subscriber signal of the plurality of subscriber signals is transmitted by a plurality of wave elements having differing incidence directions at a receiving point. An incidence direction of at least one of the wave elements is obtained in the receiving device. Directionally selective channel impulse responses are determined from the plurality of received signals and the incidence direction of the at least one wave element.

12 Claims, 5 Drawing Sheets

METHOD FOR CHANNEL ESTIMATION FROM RECEIVED SIGNALS TRANSMITTED VIA A RADIO CHANNEL

CROSS-REFERENCE TO RELATED APPLICATION

This application is a continuation of copending International Application PCT/DE98/00877, filed Mar. 25, 1998, which designated the United States.

BACKGROUND OF THE INVENTION

Field of the Invention

The invention relates to a method for channel estimation from received signals transmitted via a radio channel. The method can advantageously be used in mobile radio systems.

In a mobile radio system, information is transmitted from a transmitting radio station to a receiving radio station. This information arrives at the receiving radio station in the form of received signals. Due to various external influences, the received signals arrive at the receiving radio station via a number of propagation paths. The signal components which correspond to the various propagation paths arrive at the receiving radio station in the form of wave elements or partial waves at successive times. In the receiving radio station, there is now the problem of equalizing these signal components, which may further be influenced by other interference components, the problem of correcting the errors, and of decoding the transmitted information.

Parameters which take account of the channel conditions are determined within the receiving device, in order to evaluate the received signals. These parameters are, for example, channel impulse responses which are known, for example, from W. Koch, "Optimum and Sub-Optimum Detection of Coded Data Disturbed by Time-Varying Intersymbol Interference", IEEE Proceedings 1990, pages 1679–84, and are expressed by channel coefficients. These channel coefficients, which are used in a channel model, are used to superimpose different, successively arriving signal components of a received signal on one another in a suitable manner.

It is furthermore known to transfer the received signals to the baseband and to A/D convert them for obtaining digitized received signals. The digitized received signals as well as the channel impulse responses are supplied to a detector, which equalizes the received signals and carries out an error correction. The signal symbols reconstructed in the output of the detector are then decoded in a decoder, for example in a Viterbi decoder.

It is also known to use so-called training sequences for adjusting or equalizing receiving radio stations in mobile radio systems, see Mouly and Pautet, "The GSM System for Mobile Communications", 49. rue Louise Bruneau, F-91120 Palaiseau, France, 1992, pages 231–237. At predetermined times, the transmitting radio station transmits a sequence of digital signals which is known to the receiving radio station, that is to say whose data are available in undistorted form in the receiving radio station.

SUMMARY OF THE INVENTION

It is accordingly an object of the invention to provide a method for channel estimation which overcomes the above-mentioned disadvantages of the heretofore-known methods of this general type and which allows channel impulse responses to be determined in an improved manner, such that the determination of the channel impulse responses is resistant to interference sources.

With the foregoing and other objects in view there is provided, in accordance with the invention, a method for estimating a channel from received signals transmitted via the channel, the method comprises the steps of receiving, with receiving sensors of a receiving device, a plurality of received signals composed of at least one subscriber signal marked with transmitter-specific fine structures, the at least one subscriber signal being transmitted by a plurality of wave elements having differing incidence directions at the receiving sensors; obtaining, in the receiving device, an incidence direction of at least one of the wave elements; and determining directionally selective channel impulse responses from the plurality of received signals and the incidence direction of the at least one of the wave elements.

In the case of the method according to the invention for channel estimation from received signals transmitted via a radio channel, a receiving device is assigned a number Ka of receiving sensors, via which Ka received signals, which are assigned to the receiving sensors, are received. The received signals are composed of at least one subscriber signal which has a transmitter-specific fine structure impressed on it, in which case a k-th subscriber signal, k=1 ... K, is transmitted through the use of Kd wave elements or partial waves whose incidence direction at the receiving point differs. In a first method step, at least one direction of incidence of a wave element of a subscriber signal is evaluated so that, in a second method step, directionally selective channel impulse responses are determined from the Ka received signals and the at least one direction of incidence.

In many applications, for example in radar, sonar or seismic measurement systems having only one transmitter or reflector, or having only a small number of transmitters or reflectors—see e.g. U.S. Pat. No. 5,299,148 in this context—the number Ka of receiving sensors is greater than the number Kd of wave elements to be evaluated per subscriber, so that, using the method according to the invention, Ka-Kd fewer channel impulse responses need be determined. This also results in a reduction in the complexity of the channel estimation.

In addition, the influence of interference sources is considerably reduced by concentrating of the incidence directions of the wave elements. The channel estimation becomes more accurate.

In accordance with a preferred embodiment of the invention, the directionally selective channel impulse responses are determined from training sequences of the subscriber signals, wherein the training sequences form the transmitter-specific fine structures. If the subscriber signals contain training sequences, which are known at the receiver end, more accurate channel estimation is possible than by using data which still have to be detected in the receiving device. Furthermore, the method can thus easily be implemented in existing mobile radio systems.

A further advantageous embodiment of the invention provides that subscriber signals from a plurality of transmitters or reflectors are superimposed and arrive as the received signals in the receiving direction, wherein these signals are transmitted at the same time in one frequency channel. In this case, the subscriber signals can be separated using a CDMA method (Code Division Multiple Access). Direction-related and subscriber-signal-related channel estimation thus allows the accuracy of the determined channel impulse responses to be improved in CDMA mobile radio systems as well.

In the simplest case, it is possible to use direction information from an "a-priori-knowledge" which is obtained, for example, from geometric/geographic considerations of the locations of the mobile stations and/or base stations, and/or of interference sources as well. No further calculation effort is thus required for direction estimation.

If the receiving device does not have a sufficient a-priori-knowledge, then it is advantageous to determine the incidence directions of the wave elements and/or of interference signals from the received signals. Continuously updated values for the incidence directions are thus available. This is of interest particularly for applications in mobile radio systems.

High-resolution direction-estimation methods are used to determine the incidence directions of the wave elements. Such high-resolution direction-estimation methods, such as the MUSIC (Multiple Signal Classification) or ESPRIT (Estimation of Signal Parameters via Rotational Invariance Techniques) methods, use knowledge of the complex radiation characteristics of the receiving sensors and/or specific geometric preconditions for the configuration of the receiving sensors in order to carry out an accurate direction estimation, which involves little signal processing complexity.

The resistance to interference sources is further improved by considering additional information relating to at least one incidence direction and/or a correlation matrix of interference signals in order to determine the incidence directions of the wave elements.

According to an advantageous embodiment of the invention, directionally not selective channel impulse responses, which are associated with the individual subscribers, are determined from the received signals, and the incidence direction of at least one wave element is determined from the directionally not selective channel impulse responses. The directionally not selective channel impulse responses which are determined for Ka received signals form good raw information for the direction estimation, since channel influences have already been considered. Furthermore, conventional channel estimation devices may be used for this directionally independent channel estimation.

If the method according to the invention is used in multiple-subscriber systems, then, for a subsequent evaluation, it is necessary to assign the determined channel impulse responses to transmitters or reflectors. The subscriber signals can be separated by individual training sequences in order to assign the directionally selective channel impulse responses to transmitters or reflectors. The training sequences are thus used not only for channel estimation but also for subscriber separation. Alternatively, the subscriber signals can be despread using individual subscriber codes in order to assign the directionally selective channel impulse responses to transmitters, by which the subscriber signals can be separated.

According to a further embodiment of the invention, the determined values are averaged over a time interval in order to determine the incidence directions of the wave elements. The incidence direction changes little within a time interval which may correspond to several times the coherence time of the channel impulse responses. Averaging improves the direction estimation, since random errors are reduced. If the data are transmitted in radio blocks, the averaging can be carried out for one radio block or else for a number of radio blocks. The number of radio blocks for averaging, that is to say the time interval, may in this case be varied, with changes in the incidence directions resulting in a change in the time interval. If the channel conditions change quickly, for example if the movement of a mobile station accelerates, then the direction estimation can be limited to a shorter time interval.

According to advantageous applications of the invention, relationships between the determination of the directionally selective channel impulse responses and data detection are used.

Thus, according to one embodiment, the K subscriber signals comprise sections carrying data and training sequences, in which case the directionally selective channel impulse responses are determined from the received signals resulting from the training sequences of the K subscriber signals, and the data are detected from the received signals resulting from those sections which carry data.

In this case, the determination of the directionally selective channel impulse responses and the data detection can be carried out from subscriber signals in a radio block. A channel estimation that is as current as possible is thus available for data detection.

As an alternative to this, the determination of the directionally selective channel impulse responses and the data detection can be carried out from subscriber signals in different radio blocks. This allows, for example, parallel processing to be carried out for a channel estimation and a data detection. It also allows the computation complexity or effort for a channel estimation to be reduced, by repeating the channel estimation only at relatively long intervals.

The incidence directions and/or the directionally selective channel impulse responses can be determined again, using a follow-up or tracking method, after a period which is longer than a frame structure related to a radio block, or information relating to the incidence directions and/or the directionally selective channel impulse responses can be permanently stored in the receiving device, provided such information is not time-dependent, or only very little dependent on time. An operation and maintenance center can advantageously initiate the updating of this information relating to the incidence directions, the directionally selective channel impulse responses and/or interference sources.

Other features which are considered as characteristic for the invention are set forth in the appended claims.

Although the invention is illustrated and described herein as embodied in a method for a channel estimation from received signals transmitted via a radio channel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
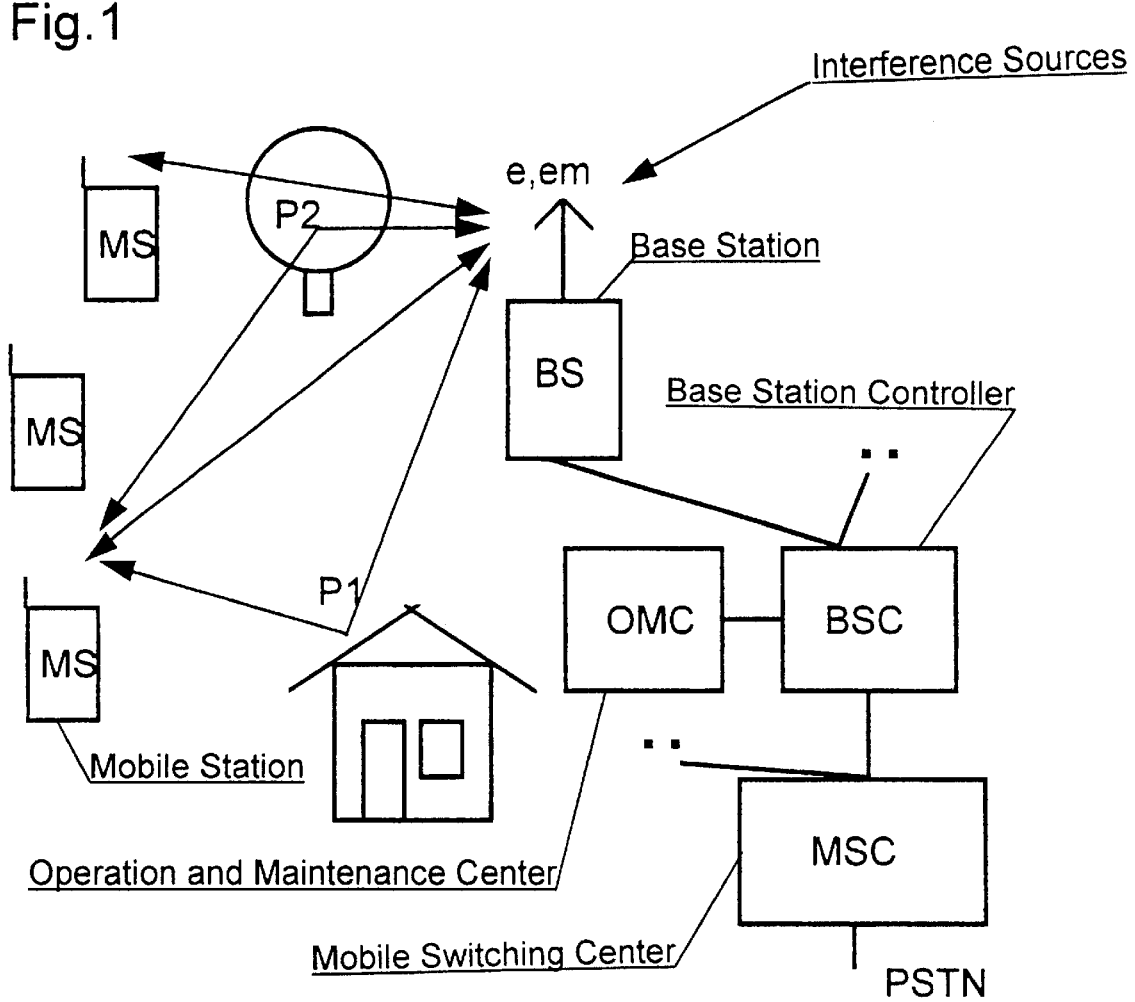
FIG. 1 is a schematic block diagram of a mobile radio network.

Referring now to the figures of the drawings in detail and first, particularly, to FIG. 1 thereof, there is shown a structure of a mobile communications system which corresponds to the GSM mobile radio network. The mobile communications system includes a plurality of mobile switching centers MSC, which are networked with one another and produce access to a fixed network PSTN. Furthermore, these mobile switching centers MSC are each connected to at least one base station controller BSC. Each base station controller BSC in turn allows a link to at least one base station BS.

Such a base station BS is a radio station which can set up a communication link to mobile stations MS via an air interface. By way of example, FIG. 1 shows two radio links between two mobile stations MS and one base station BS. A house P1 and a tree P2 are reflectors for one of the radio links. The reflectors cause additional wave elements. An operation and maintenance center OMC provides monitoring and maintenance functions for the mobile radio network or at least for parts of it. This structure can be transferred to other mobile radio networks in which the invention may be used.

The communication links between the base station BS and the mobile stations MS are subject to multipath propagation caused by reflections, for example on buildings or vegetation, in addition to the direct propagation path. If it is assumed that the mobile stations MS are moving, then multipath propagation together with other interference sources result in the signal components from the various propagation paths of subscriber signals being superimposed at the receiving base station BS as a function of time. Furthermore, it is assumed that the subscriber signals from various mobile stations MS are superimposed at the reception point to form a received signal e, em. The task of the receiving base station BS is to detect data d transmitted in the subscriber signals and to assign such data d to individual subscriber-specific communication links.

Figure 2:
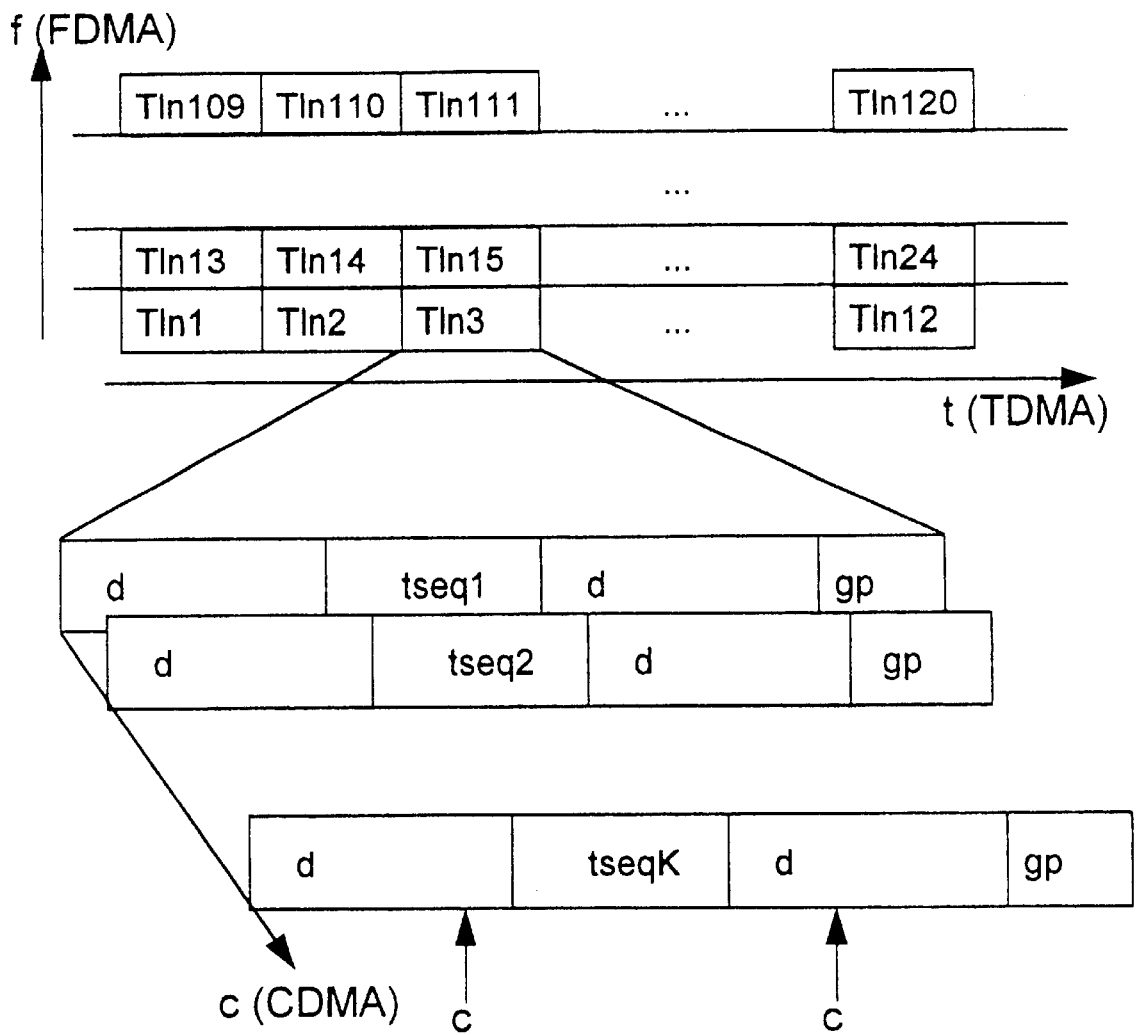
FIG. 2 is block diagram of a frame structure of radio blocks for an air interface.

FIG. 2 illustrates the transmission of the subscriber signals via the air interface. The air interface in this case has a frequency-division multiplex component (FDMA), a time-division multiplex component (TDMA) and a code-division multiplex component (CDMA). A plurality of frequency bands are provided along the frequency axis f for the mobile radio network. Furthermore, the time axis t is subdivided into a time grid, comprising a plurality of time slots per time frame, such that a transmission is carried out in radio blocks. The subscriber signals from a plurality of mobile stations MS are assigned to a subscriber group, Tln1, Tln2 . . . Tln120, that is to say, during the radio block from one subscriber group, for example Tln3 for the three mobile stations MS in FIG. 1, the subscriber signals are superimposed to form a received signal e, em, which is to be evaluated by a receiving device in the base station BS.

Within a radio block, a subscriber signal comprises two data carrying sections with data d, in the center of which a subscriber-specific training sequence tseq1 to tseqK is incorporated. The radio block is terminated by a guard period gp. The subscriber signals are distinguished by a subscriber code c, which is determined by transmitter-specific and thus subscriber-specific fine structures within the sections which carry data. The fine structures are defined by the subscriber-specific CDMA codes $c^{(k)}$, k=1 . . . K. The subscriber signals can be separated through the use of these CDMA codes c, which will be referred to as subscriber codes from now on and are known at the receiving end.

Figure 3:
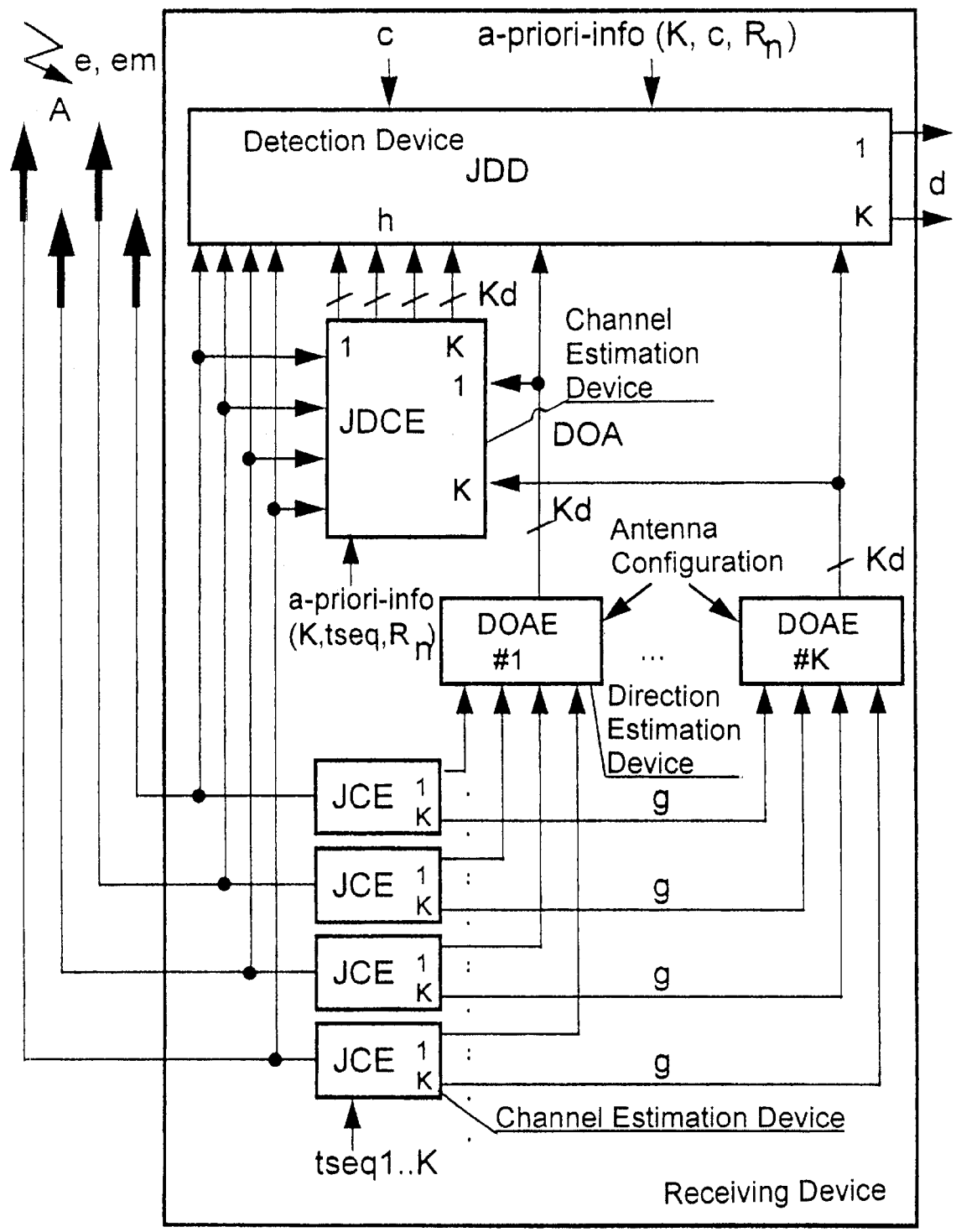
FIG. 3 is a schematic block diagram of a receiving device having associated receiving sensors.

FIG. 3 shows a receiving device having associated receiving sensors A. This receiving device is part of the base station BS and receives received signals e, em from the transmitting mobile stations MS in the mobile radio network. The following text describes the situation where the base station BS is receiving but, nevertheless, there is normally a two-way communication link, that is to say the base station BS also has a transmitting device.

The Ka=4 receiving sensors A form an antenna device, which is constructed as an intelligent antenna device, that it to say a plurality of receiving sensors A in this intelligent antenna device simultaneously receive received signals e or em, which are combined with one another in such a manner that the transmission quality is better than with systems using one receiving antenna.

Digital signals are generated from the received signals e, em, for example by transferring them to a baseband followed by an analog/digital conversion, and are evaluated in the receiving device.

The receiving device includes a plurality of channel estimation devices JCE, a plurality of direction estimation devices DOAE, a directionally selective channel estimation device JDCE, and a detection device JDD. In addition to the received signals e, em, the receiving device has an "a priori info" knowledge relating to the number K of subscribers, their training sequences tseq1, . . . ,tseqK and their subscriber code c, and information relating to interference signals may, possibly, also be available.

The channel estimation devices JCE are supplied with the—already digitized—received signals em from the receiving sensors A. The channel estimation devices JCE determine the channel impulse responses g, which are not directionally selective, through the use of a Gauss-Markov or maximum-likelihood estimation. The signal received by a respective one receiving sensor A is evaluated by a respective one channel estimation device JCE, with K directionally not selective channel impulse responses g being provided at each of the outputs of the channel estimation devices JCE. These directionally not selective channel impulse responses g are calculated from the received signals $em^{(ka)}$, ka=1 . . . Ka, which originate from the training sequences tseq1 to tseqK of the K=3 subscriber signals.

The directionally not selective channel impulse responses g are each supplied to the K direction estimation devices DOAE which, related to the subscribers, carry out a direction estimation based on these directionally not selective channel impulse responses g. The number of incidence directions determined per subscriber signal is denoted by Kd. This number Kd may differ from subscriber signal to subscriber signal. The single-dimensional or multidimensional UNITARY-ESPRIT algorithm is used when determining the incidence directions (also called the DOA, Direction Of Arrival).

The received signals $em^{(ka)}$, which result from the training sequences tseq1 to tseqK of the receiving sensors A, and the determined incidence directions DOA of the wave elements are processed in the directionally selective channel estimation device JDCE, and are used to determine directionally selective channel impulse responses h. This channel estimation is based on the method of maximum-likelihood estimation.

Finally, the Ka received signals $em^{(ka)}$, ka=1 . . . Ka, the determined directionally selective channel impulse responses h and the determined incidence directions DOA are supplied to the detection device JDD, which also processes the subscriber codes c and additional an a-priori-info knowledge relating to the incidence direction of interference signals in the form of $R_n$, or the geographical position of the mobile station MS with respect to the base station BS.

The data d are detected in this detection device JDD, based on the received signals $e^{(ka)}$ which result from the sections which carry data. A zero-forcing method is used for this purpose. Alternative advantageous methods are the maximum-likelihood estimation or an MMSE method. Following data detection, the detected data of the K subscriber signals for a radio block are applied to outputs of the detection device JDD.

In the method of data detection according to the invention, a channel estimation of channel impulse responses g is carried out in a first method step, without considering directional inhomogeneities. In a second step, the determined channel impulse responses g are used to determine the incidence directions DOA of one or more wave elements, following which, in a third step, directionally selective channel impulse responses h, that is to say channel impulse responses which can be assigned to the different incidence directions, are determined from the received signals by taking the incidence directions DOA into account. This step is based on the knowledge that each conventional, directionally not selective channel impulse response $g^{(k)(ka)}$ is generated by superimposing Kd directionally selective channel impulse responses $h^{(k)(kd)}$, where k=1 ... K and kd=1 ... Kd.

Thus:

$$g^{(k)(ka)} = \sum_{kd=1}^{Kd} a^{(k)(ka)(kd)} \cdot h^{(k)(kd)}, \quad \text{where } k = 1 \ldots K \text{ and } ka = 1 \ldots Ka \quad (1)$$

In this case, $a^{(k)(ka)(kd)}$ are complex weighting factors for a superposition of directionally selective channel impulse responses $h^{(k)(kd)}$ to form the directionally not selective channel impulses responses $g^{(k)(ka)}$. Information or knowledge relating to incidence directions or correlation matrices of interference wave elements may also be used to determine the directionally selective channel impulse responses h.

The total number W·K·Ka of parameters to be estimated in $g^{(k)(ka)}$, k=1 ... K, ka=1 ... Ka is normally considerably greater, in the case of multi-antenna systems, than the total number W·K·Kd of parameters to be estimated in $h^{(k)(kd)}$, k=1 ... K, kd=1 ... Kd, since Ka>Kd. The computation complexity for assessing the parameters is thus reduced using the method according to the invention.

During the reception of a combined received signal em, which advantageously results from the training sequences in the subscriber signals and contains the received signals $em^{(ka)}$, ka=1 ... Ka from the Ka receiving sensors, this received signal em has the form:

$$em = G \cdot h + n \quad (2)$$

where G is a known matrix (L*Ka)×(W*K*Kd) where L denotes the number of discrete-time samples of the received signal em and W denotes the length of the channel impulse responses. This matrix G results from the geometrical disposition or configuration and the complex characteristics of the Ka receiving sensors, from the transmitted training sequences and from the Kd incidence directions DOA. The vector h includes the discrete-time baseband equivalent of the K*Kd directionally selective channel impulses responses $h^{(K)(Kd)}$; $n_m$ denotes an unknown (L*Ka) column vector of a time-discrete interference signal.

G and em are known from equation (1), so that the directionally selective channel impulse responses h can be determined.

During reception of the sections carrying data, the combined pi received signal e of the received signals $e^{(ka)}$ from the receiving sensors has the form:

$$e = A \cdot d + n \quad (3)$$

where A is a (M*Ka)×(N*K) matrix, in which M denotes the number of discrete sampling instants for the received signal and N denotes the number of data symbols transmitted per subscriber; n is again an unknown (M*Ka) column vector of a time-discrete interference signal.

In equation (3), A and e are known, so that the data d can be detected. A is known from the K*Kd incidence directions, the directionally selective channel impulse responses h, the geometrical configuration and the complex characteristics of the receiving sensors and, when using a CDMA subscriber separation, from the subscriber code used.

In a fourth method step, the data d are detected from the received signals e resulting from those sections of the K subscriber signals, which carry data, using the previously determined incidence directions DOA and the directionally selective channel impulse responses h. If required, knowledge relating to incidence directions, the power, the spectrum and the covariance matrix of interference signals may also be used in this step.

The directionally selective channel impulse responses h are advantageously determined using the Gaussian-Markov estimation method, in which an estimated value $\hat{h}$ for the directionally selective channel impulse responses h can be calculated from:

$$\hat{h} = (G^{*T} \cdot \tilde{R}_n^{-1} \cdot G)^{-1} \cdot G^{*T} \cdot \tilde{R}_n^{-1} \cdot em \quad (4)$$

$\tilde{R}_n$ denotes the covariance matrix for the interference signal $n_m$, which is determined from the incidence directions and relative powers of the interference wave elements, the spectra of the interference signals, and from the geometrical configuration and complex radiation characteristic of the receiving sensors. This method corresponds to the maximum-likelihood estimation of the directionally selective channel impulse responses h, and can be carried out with relatively little effort by a recursive solution of (4).

Relationships between the direction estimation and the determination of the directionally selective channel impulse responses, respectively, and the data detection are used as follows. The K subscriber signals are composed of sections carrying data and training sequences, in which case the directionally selective channel impulse responses are determined from the received signals resulting from the training sequences of the K subscriber signals, and the data are detected from the received signals resulting from the sections carrying data.

In addition, in order to reduce the complexity, the incidence directions DOA and/or the directionally selective channel impulse responses h can be determined again, using a follow-up or tracking method, after a period which is longer than a frame structure related to a radio block.

Figure 4:
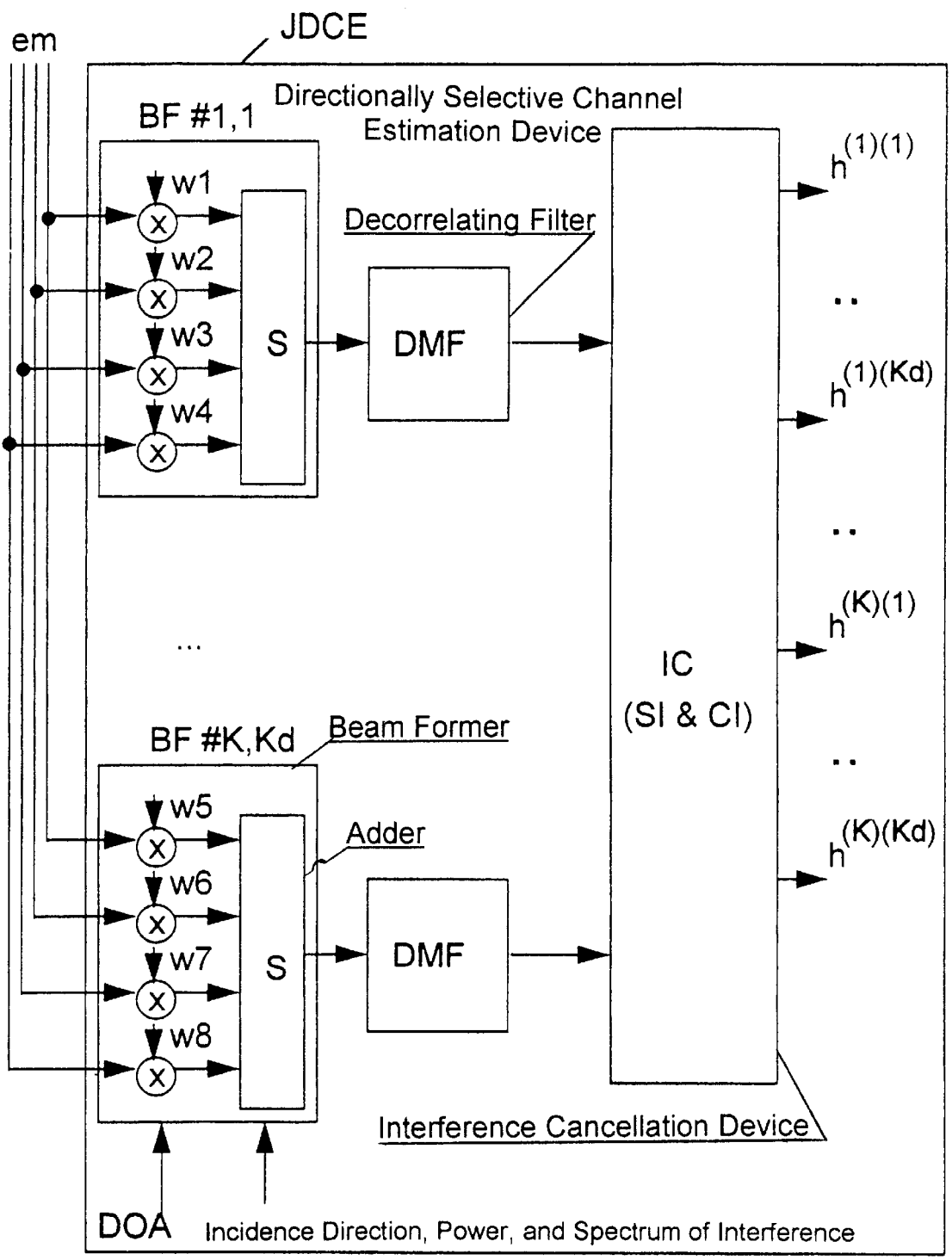
FIG. 4 is a schematic block diagram of a directionally selective channel estimation device.

FIG. 4 shows a directionally selective channel estimation device JDCE, which contains beam formers BF which, for each of the Ka received signals $em^{(ka)}$ apply a weighting, resulting from beam-former-specific weighting factors w1 to w4 and w5 to w8, and add the signal components in an adder device S to form a signal for which the signal-to-noise ratio is maximized, with this signal subsequently being supplied to a decorrelating signal-matched filter DMF. The self-interference SI and cross-interference CI are compensated for in a device IC for interference cancellation, and directionally selective channel impulse responses h are obtained.

In addition, the information relating to the incidence directions DOA of the wave elements and relating to the directions and relative powers of the interference wave elements are processed in the beam formers BF. These directions influence the weighting factors w1 to w4 and w5 to w8 for each beam former BF individually. The beam formers BF and the decorrelating, signal-matched filters DMF act like a spatially resolving, decorrelating signal-matched filter, and are respectively applied to one wave element, and thus to K*Kd wave elements.

Figure 5:
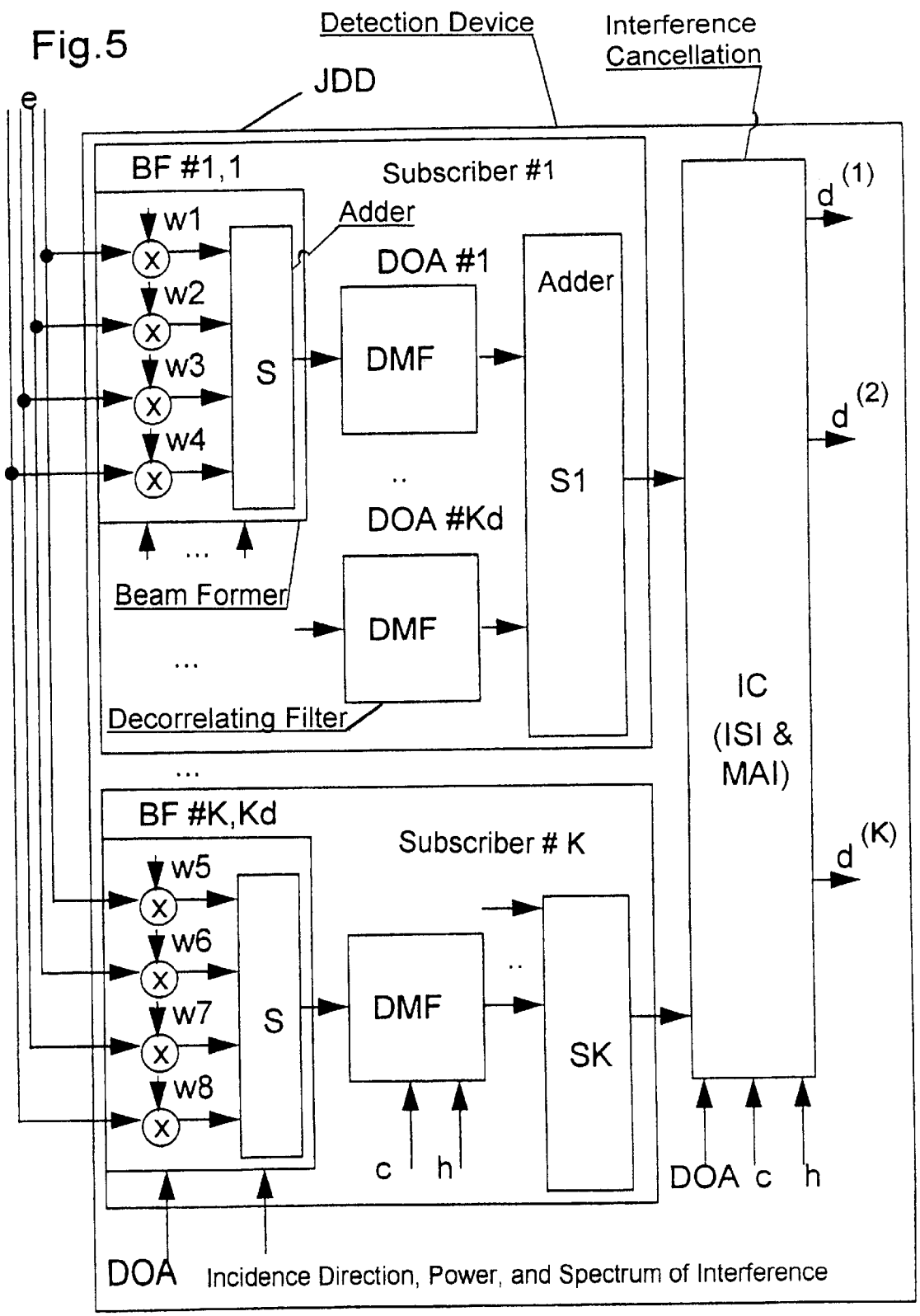
FIG. 5 is a schematic block diagram of a detection device.

FIG. 5 shows the detection device JDD. This detection device JDD processes those sections of the received signals e which carry data, in which case a spatially resolving, decorrelating signal-matched filter superimposes the K*Kd wave elements of the received signals e, in order to maximize the signal-to-noise ratio, in accordance with the described procedure in the directionally selective channel estimation device JDCE. This maximization of the signal-to-noise ratio is carried out for each incidence direction DOA of each subscriber signal, with the Kd signal components of the individual wave elements of a subscriber signal being superimposed in adder devices S1 to SK, using the maximum-ratio-combining method.

The subscriber signals are then supplied to a device IC for interference cancellation, which compensates for the intersymbol interference ISI and the multiple access interference MAI. The information relating to the subscriber codes c, the incidence directions DOA, the directionally selective channel impulse responses h and, possibly, an a-priori-knowledge relating to the interference sources in the form of $R_n$ is also processed in this case. The detected data d from the subscriber signals are produced separately at one output of the device IC for interference cancellation. A so-called JD (Joint Detection) method is used for interference cancellation.

The receiving device according to the invention reduces the time dispersion and variance of the received signals. Furthermore, the spatial resolution allows to cover an increased number of mobile stations MS in a radio area of a base station BS. It also allows the radio area to be shaped by using a directional effect, such that the transmitted powers from the mobile stations MS are considerably reduced.

We claim:

1. A method for estimating a channel from received signals transmitted via the channel, the method which comprises:

receiving, with receiving sensors of a receiving device, a plurality of received signals composed of at least one subscriber signal marked with transmitter-specific fine structures, the at least one subscriber signal being transmitted by a plurality of wave elements having differing incidence directions at the receiving sensors;

obtaining, in the receiving device, an incidence direction of at least one of the wave elements; and determining directionally selective channel impulse responses from the plurality of received signals and the incidence direction of the at least one of the wave elements.

2. The method according to claim 1, which comprises determining the directionally selective channel impulse responses from training sequences forming the transmitter-specific fine structures.

3. The method according to claim 1, which comprises receiving, at the receiving device, the at least one subscriber signal from components selected from the group consisting of transmitters and reflectors as superimposed signals forming the received signals, the received signals being transmitted at the same time in one frequency channel.

4. The method according to claim 1, which comprises providing, in the receiving device, the differing incidence directions of the wave elements as an a-priori-knowledge.

5. The method according to claim 1, which comprises providing, in the receiving device, incidence directions of interference signals as an a-priori-knowledge.

6. The method according to claim 5, which comprises:

determining directionally non-selective channel impulse responses from the received signals; and determining the incidence direction of the at least one wave element from the directionally non-selective channel impulse responses.

7. The method according to claim 1, which comprises determining incidence directions of interference signals from the received signals.

8. The method according to claim 1, which comprises determining the differing incidence directions of the wave elements from the received signals.

9. The method according to claim 8, which comprises determining the differing incidence directions of the wave elements by considering additional information relating to at least of an incidence direction and a correlation matrix of interference signals.

10. The method according to claim 1, wherein the at least one subscriber signal is a plurality of subscriber signals and which comprises separating the plurality of subscriber signals by individual training sequences for assigning the directionally selective channel impulse responses to at least one component selected from the group consisting of transmitters and reflectors.

11. The method according to claim 1, wherein the at least one subscriber signal is a plurality of subscriber signals and which comprises separating the subscriber signals by despreading with individual subscriber codes for assigning the directionally selective channel impulse responses to individual transmitters.

12. The method according to claim 1, which comprises averaging the incidence direction of the at least one of the wave elements over a time interval for determining an averaged incidence direction.

* * * * *